Dec. 27, 1927.  
E. M. COLE  
1,654,412  
DEPTH GAUGE AND LIFTING MECHANISM FOR FRAMES  
Filed July 9, 1926  
2 Sheets-Sheet 1

E. M. Cole, Inventor

By

His Attorney

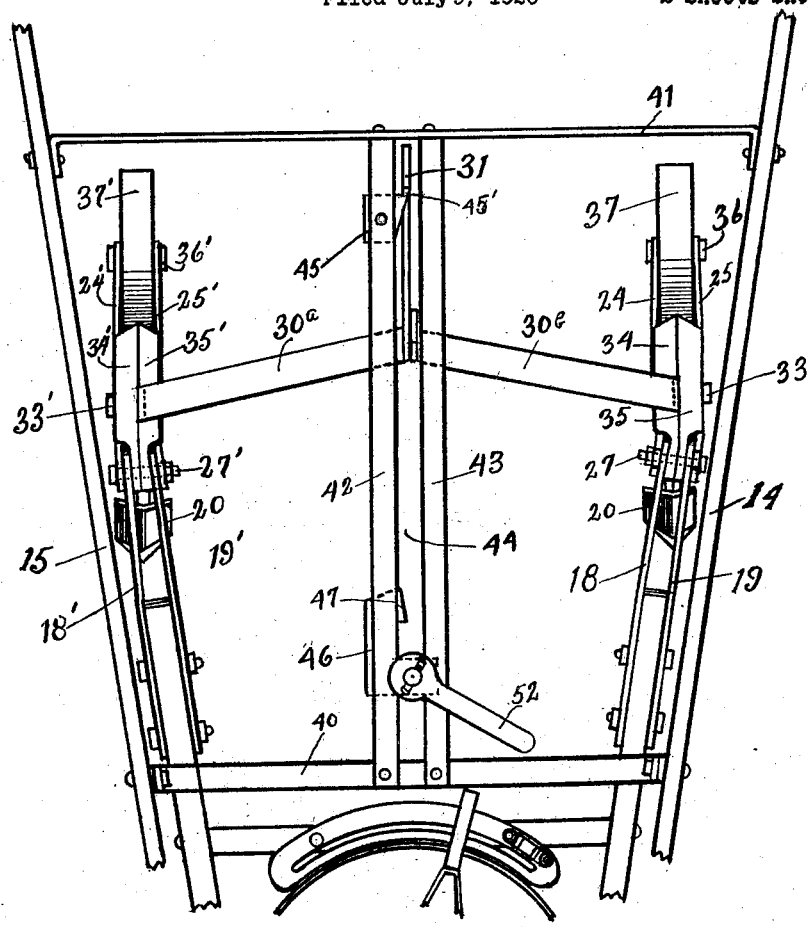

Patented Dec. 27, 1927.

1,654,412

UNITED STATES PATENT OFFICE.

EUGENE M. COLE, OF CHARLOTTE, NORTH CAROLINA.

DEPTH GAUGE AND LIFTING MECHANISM FOR FRAMES.

Application filed July 9, 1926. Serial No. 121,376.

This invention relates to frame structures and more especially to means for adjusting the elevation of the rear end of an agricultural implement frame, both to regulate the depth of cut of the earth working implements carried by the frame and also to raise the implements entirely out of the ground for transport purposes.

An object of my invention is to provide means for easily, quickly, rigidly, simultaneously and fixedly adjusting the rear end of a wheeled frame, and more especially an agricultural implement frame, such as a planter, guano distributor, cultivator and the like, and also for regulating the depth of cut of the earth working implements carried thereby, also for lifting the implements entirely out of the ground when it is desired to transport the frame from one place to another.

Another object of my invention is to provide a wheeled frame with elevation adjusting means which can be critically adjusted to suit the use to which the frame is applied.

Another object of my invention is to provide adjusting means for the rear end of an agricultural frame in which both sides of the frame are adjusted to the same extent and at the same time.

Some of the objects of my invention being stated, a brief description of the various figures in the drawings will now follow, in which—

Figure 2 is a plan view of the rear portion of the frame shown in Figure 1, showing my depth regulating and lift mechanism and associated parts;

Figure 3 is an enlarged detail plan view of the depth regulating means;

Figure 4 is a cross-sectional enlarged detail view of the structure set forth in Figure 3;

A brief description of the drawings having been given, a detailed description of the same will now follow in which like reference characters indicate corresponding parts throughout the drawings.

Figure 1:
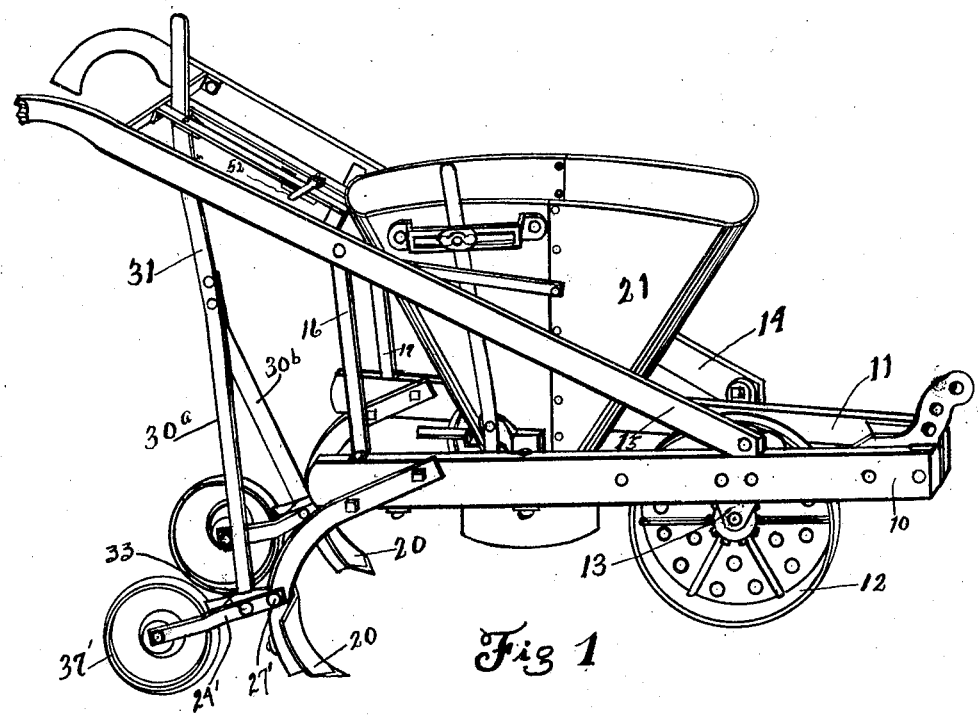
Figure 1 is a perspective view of a guano distributor equipped with my depth regulating and lift mechanism.

The numerals 10 and 11 indicate the side members of a substantially V-shaped frame which has a ground wheel 12 secured to brackets 13 near the front end thereof. Handle members 14 and 15 are secured to the frame near the front end thereof and are secured to upright members 16 and 17, which members are secured at their lower ends to the rear portions of the side members 10 and 11.

Secured to the rear side portions of the members 10 and 11 are the cultivator arms which are composed of the members 18, 19, 18′ and 19′, which members slant rearward, downward and forward and have plow members 20 on their lower ends.

I have shown a hopper 21 and associated parts secured to the frame, though I desire it to be understood that the structure set forth in this invention may appropriately be applied to any agricultural implement frame.

Secured to the side portions of the cultivator arms are the members 24, 25, 24′ and 25′ by means of the bolts 27 and 27′. The cultivator arms are each composed of two members, and between the arms 18 and 19 are secured the members 34 and 35, the member 34 having an approximately vertical groove in its inner face for the reception of the prong 30$^b$ of the lever 31. The bolt 27 penetrates the members 24 and 25, the cultivator arm members 18 and 19, and also the hole 32 in the forward ends of the members 34 and 35, making a pivotal connection with the cultivator arm members 18 and 19. A bolt 33 penetrates the central portions of the members 24 and 25 and also the central portions of the members 34 and 35, and also the lower portion of the prong 30$^b$, holding these parts rigidly together, thus forming a connection with the adjusting lever in which there is no lost motion, and which insures a perfect adjustment of the depth of cut of the earthworking members mounted on the frame. As is apparent from the drawings, especially in Figures 2, 5 and 7, it will be seen that the prongs of the lever are held rigidly in place at all times.

The members 34 and 35 project rearwardly and have portions which serve as scrapers for the wheel 37. The members 24 and 25 extend rearward after being secured to the portions 34 and 35 and have a hole in their rear ends for the reception of the bolt 36 on which a suitable journal bearing is mounted on which rotates the wheel 37.

Figures 5, 6, 7:
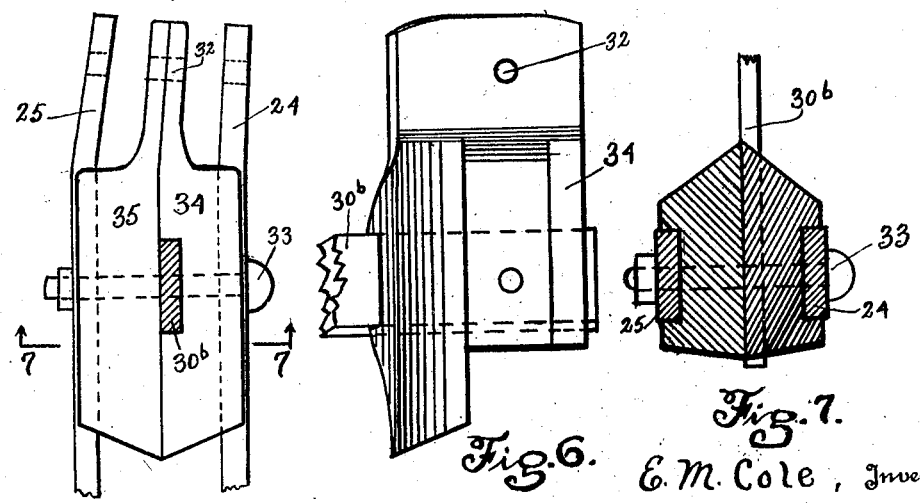
Figure 5 is a plan view of the structure for holding the lower ends of the adjusting lever rigidly to the wheel frames.
Figure 6 is a side perspective of Figure 5 with the members 24 and 25 removed.
Figure 7 is a cross-sectional view taken along the line 7—7 in Figure 5, looking in the direction indicated by the arrows.

The detailed description of one of the wheel mounts will equally apply to the other wheel mount, the reference characters for the other wheel mount being primed (') to indicate corresponding parts, the only difference in the parts being that the forward portions of the members 24', 25', 34' and 35' are curved in the opposite direction from that shown in Figure 5, and also with the difference in that the member 35' has the groove therein for the reception of the prong 30ª of the lever 31.

Secured between the handle members 14 and 15 are the crosspieces 40 and 41, and secured near the medial portions of these crosspieces are the longitudinally extending members 42 and 43, which are placed some distance apart, leaving a slot 44 therebetween. The adjusting lever 31 is adapted to operate in this slot 44.

Near the upper end of the member 42 there is secured the catch 45 which projects into the slot 44, but does not project all the way across the said slot, room being allowed for the lever 31 to pass this catch when desired by the operator. Near the lower end of the slot 44 is shown the adjusting means. This means consists of the member 46 which has the lug 47 projecting into the slot 44 about the same distance that the member 45 projects. The member 46 also has the projection 48 which extends across the slot 44 and fits against the lower side of the member 43. This projection 48 is held against the lower faces of the members 42 and 43 by means of the bolt 49 and associated parts. These associated parts comprise the washer 50, nut 51, wrench 52 and the pin 53. The washer 50 is loosely mounted on the bolt 49 and fits against the upper faces of the members 42 and 43, while the nut 51 threadably engages the bolt 49 and is adapted to be screwed onto the bolt by means of the special wrench 52. The bolt 49 is extended and has a cotter pin or other suitable means placed therein, so the wrench can be lifted from the nut 50 and re-inserted on the nut without entirely removing it from the bolt 49. In this way the wrench is never lost and is always with the adjusting device when it is desired to adjust the same along the groove 44.

The lever 31 projects upwardly through the groove or slot 44, and when placed in the position shown in Figures 1 and 2 will raise the plows 20 out of the ground simultaneously, and by adjustment of the member 46 along the slot 44 the depth of cut of the plows 20 may be regulated.

It is readily seen that due to the rigid connection between the pivoted arms and the lever prongs 30ª and 30ᵇ, together with the peculiar form of pivotal connection of the wheel carrying arms, and also to the secure manner in which the upper portion of the lever 31 is adjusted and held that there is no lost motion in any direction, resulting in a very substantial adjustable framework.

The method of operation of my device is as follows:

For transport position the lever 31 is placed in the position shown in Figures 1 and 2, with the plows 20 raised entirely off the ground, the wheels 37, 37' and 12 supporting the frame.

If it is desired to let the plows 20 deep into the ground the adjusting mechanism composed of the member 46 and associated parts is secured near the cross piece 40 and the lever 31 is pressed over against the member 43 and then forward in the slot 44 and is lodged against the projection 47 at whatever position the same may be adjusted. The depth of cut of the plows 20 is adjusted by securing the adjusting mechanism 46 and associated parts at the desired position along the slot 44. When it is desired to raise the plows 20 entirely out of the ground the above described operation is reversed, the lever 31 being pressed over against the member 43 and out of engagement with the lug 47 and is pulled rearwardly and placed behind the projection 45' on the member 45, where it is held firmly in transport position.

It is thus seen that I have devised a depth gauge and lifting device for frames in which the depth of cut of earthworking implements carried by the frame may be critically and easily adjusted by a single operation.

I desire it to be understood that although specific terms are employed, they are used in a generic and descriptive sense, and not for purposes of limitation, and although I have shown and described the invention in connection with an agricultural implement frame, I desire it to be understood that my depth gauge and lift mechanism may be used on any wheeled frame, the scope of the invention being set forth in the appended claims.

I claim:

1. Means for raising and lowering the rear end of an implement frame comprising wheel frames secured to the rear end of the implement frame, a lever rigidly attached to the wheel frames, adjustable means associated with the lever for adjusting the height of the frame with respect to the wheels, said adjustable means comprising two spaced longitudinally disposed bars between which the lever is adapted to slide, and means adjustably mounted on the spaced bars for holding the lever in adjusted position.

2. In a depth regulating means for implement frames, a wheel mounted for rotation at the front end of the frame, pivoted arms secured to the rear end of the frame, wheels mounted for rotation in the free ends of the pivoted arms, a forked lever having its forks rigidly secured to the pivoted arms, a longitudinally disposed guideway secured to the frame above the pivoted arms, said guideway being adapted to receive the free end of the forked lever, and adjustable means secured in the guideway for adjusting the position of the lever.

3. In an implement frame, a ground wheel mounted at the front end of the frame, a pair of earthworking implements secured to the rear end of the frame, a pair of arms pivotally secured to the rear end of the frame, a lever secured to both of these pivoted arms, a pair of handle members secured to the implement frame, a longitudinal guideway secured between the handle members, the upper portion of the lever being adapted to fit into the guideway, means in the guideway for holding the lever in fixed position, and adjustable means located in the guideway adapted to be adjusted along the guideway to hold the lever in any desired position.

4. In an agricultural implement frame, a pair of earthworking implement carrying arms secured to the rear end of the frame, a wheel for supporting the front end of the frame, arms pivotally secured to the implement carrying arms, wheels rotatably mounted in the free ends of said arms, an inverted Y-shaped lever rigidly secured to the pivoted arms, a guideway mounted in the frame above the implement carrying arms, adjustable means secured in the guideway adapted to hold the free end of the lever and to adjust the height of the frame with respect to the wheels.

5. In an agricultural implement frame, a ground wheel rotatably mounted near the front portion of the frame, handle members secured to the frame, earthworking implements carried by the rear portion of the frame, wheel carrying arms pivotally secured to the rear portion of the frame, a lever rigidly secured to said arms and projecting upwardly between the handle members, longitudinal members spaced apart from each other and secured to the handle members leaving a slot between the said longitudinal members in which the upper end of the lever is adapted to move, fixed means for holding the lever in position in the slot, and adjustable means for holding the lever in adjusted position in the slot, said lever being adapted to automatically move forward in the slot when released from the first holding means.

6. In an agricultural implement frame, a ground wheel secured to the front end of the frame, wheel carrying pivoted arms secured to the rear portion of the frame, members secured in the wheel carrying arms for rigidly holding a lever, said members comprising flat surfaces fitting against each other, a groove in one of the members, the said groove being adapted to receive the lower end of an adjusting lever, a bolt penetrating the members and the end of the lever and holding the said parts in rigid position.

7. In an agricultural implement frame, supports for the rear end of the frame, lever means rigidly connecting the rear supports together, means on the frame adapted to cooperate with the lever means for simultaneously, positively and rigidly adjusting the height of the frame above the rear supports, said adjusting means comprising spaced longitudinal bars, a lug member adjustable along the bars and projecting into the path of the lever which is adapted to slide between the bars, and a fixed lug secured on one of the bars and extending into the space between the bars, said fixed lug being adapted to hold the lever when the frame is in elevated position.

8. In an implement frame a wheel for supporting the front end of the frame, arms pivotally secured to the rear end of the frame, wheels rotatably secured in the pivoted arms, an inverted forked lever rigidly secured to the pivoted arms, a guideway secured to the implement frame adapted to receive the free end of the lever, means for holding the lever in fixed position in the guideway, means for holding the lever in adjusted position in the guideway, being adapted to automatically return to adjusted position when not held in fixed position.

In testimony that I claim the foregoing as my own, I have signed my name to this specification.

EUGENE M. COLE.